(12) United States Patent
Berna

(10) Patent No.: US 12,728,933 B2
(45) Date of Patent: Sep. 8, 2026

(54) ACCESS SYSTEM FOR A CONTAINER OF GOODS

(71) Applicant: Greg E. Berna, Lakewood, IL (US)

(72) Inventor: Greg E. Berna, Lakewood, IL (US)

(*) Notice: Subject to any disclaimer, the term of this patent is extended or adjusted under 35 U.S.C. 154(b) by 349 days.

(21) Appl. No.: 18/541,883

(22) Filed: Dec. 15, 2023

(65) Prior Publication Data

US 2025/0196940 A1 Jun. 19, 2025

(51) Int. Cl.
*B62D 33/04* (2006.01)
*B60J 5/04* (2006.01)

(52) U.S. Cl.
CPC ............ *B62D 33/04* (2013.01); *B60J 5/0497* (2013.01)

(58) Field of Classification Search
CPC . B62D 33/04; B60J 5/0497; B60J 5/06; B60J 5/062
See application file for complete search history.

(56) References Cited

U.S. PATENT DOCUMENTS 2,494,638 A 1/1950 Stine
2,974,996 A * 3/1961 Bitterman ................ B60J 5/062 49/125
3,042,960 A 7/1962 Spork
3,302,691 A 2/1967 Andrews et al.
3,879,799 A 4/1975 Williams
3,910,174 A 10/1975 Nelles
4,141,106 A 2/1979 Dixon
4,401,033 A 8/1983 Gerken
4,454,690 A 6/1984 Dixon
4,515,815 A 5/1985 Kosikowski
4,837,891 A 6/1989 Toma et al.
4,991,257 A 2/1991 Eutebach
5,038,534 A 8/1991 Pollock
5,181,296 A 1/1993 Williams
5,230,123 A 7/1993 Williams et al.
5,406,676 A 4/1995 Williams et al.
6,079,174 A 6/2000 Williams et al.
6,109,641 A 8/2000 Guy
6,167,937 B1 1/2001 Williams
6,312,040 B1 * 11/2001 Shinohara ................ B60J 7/065 296/105
6,393,772 B1 5/2002 McRoberts et al.
8,186,747 B2 5/2012 Bloodworth et al.
(Continued)

FOREIGN PATENT DOCUMENTS

CN 207158001 U 3/2018
CN 108557286 A 9/2018
(Continued)

OTHER PUBLICATIONS

International Design Awards (IDA), "Sideways Trucking Drive Thru Distribution", Berna Architects and Design, https://fg.idesignawards.com/winners/zoom.php?eid=9-21501-18, 2018.

*Primary Examiner* — Robert E Fuller
(74) *Attorney, Agent, or Firm* — Wong Meyer Smith & McConnell

(57) ABSTRACT

An access system for a container of goods, cargo or people having an access opening, a track and a plurality of load bearing panels. The panels are arranged in a flush orientation in a first plane to occlude the access opening. Each panel is individually moveable to a second plane then slidable along the second plane to enable access to the interior.

29 Claims, 8 Drawing Sheets

(56) References Cited

U.S. PATENT DOCUMENTS

| | | | |
|---|---|---|---|
| 8,468,751 | B2 | 6/2013 | Williams |
| 9,151,107 | B2 | 10/2015 | Kaczmarczyk et al. |
| 9,457,970 | B1 | 10/2016 | Zevenbergen et al. |
| 9,470,028 | B2 | 10/2016 | Header et al. |
| 9,511,960 | B1 | 12/2016 | Bradford |
| 9,567,168 | B1 | 2/2017 | Tibbens et al. |
| 9,636,983 | B2 | 5/2017 | Hindman |
| 9,738,141 | B2 | 8/2017 | Yamaguchi et al. |
| 9,777,502 | B2 | 10/2017 | Curlander et al. |
| 10,167,146 | B2 | 1/2019 | Johnston |
| 10,183,702 | B2 | 1/2019 | Jaworski et al. |
| 10,185,921 | B1 | 1/2019 | Heller et al. |
| 10,207,621 | B2 | 2/2019 | Friemel et al. |
| 10,219,447 | B1 | 3/2019 | Decarli et al. |
| 10,241,516 | B1 | 3/2019 | Brady et al. |
| 10,273,085 | B2 | 4/2019 | Battles et al. |
| 10,279,990 | B2 | 5/2019 | Ronstadt |
| 10,287,732 | B1 | 5/2019 | Warford |
| 10,316,572 | B2 | 6/2019 | Leitmann et al. |
| 10,329,763 | B2 | 6/2019 | McCloud et al. |
| 10,449,886 | B2 | 10/2019 | Richardson |
| 10,479,419 | B2 | 11/2019 | Storz et al. |
| 10,781,629 | B2 | 9/2020 | Haab et al. |
| 10,854,067 | B1 | 12/2020 | Giles |
| 2001/0033879 | A1 | 10/2001 | Hunt et al. |
| 2006/0057249 | A1 | 3/2006 | Bell et al. |
| 2011/0219651 | A1* | 9/2011 | Borreggine ............... G09F 9/33 296/180.1 |
| 2017/0193008 | A1 | 7/2017 | Kreft |
| 2018/0155032 | A1 | 6/2018 | Gil et al. |
| 2018/0247266 | A1 | 8/2018 | Knapp et al. |
| 2019/0044999 | A1 | 2/2019 | Ferguson et al. |
| 2019/0130349 | A1 | 5/2019 | Ferguson et al. |
| 2019/0273963 | A1 | 9/2019 | Jobanputra et al. |
| 2019/0337534 | A1 | 11/2019 | Beckman et al. |
| 2020/0379938 | A1 | 12/2020 | Poulsen et al. |
| 2020/0385207 | A1 | 12/2020 | Godwin et al. |
| 2022/0402530 | A1 | 12/2022 | Beckman et al. |

FOREIGN PATENT DOCUMENTS

| | | | |
|---|---|---|---|
| DE | 2044085 | A1 | 3/1972 |
| GB | 1218235 | A | 1/1971 |

* cited by examiner

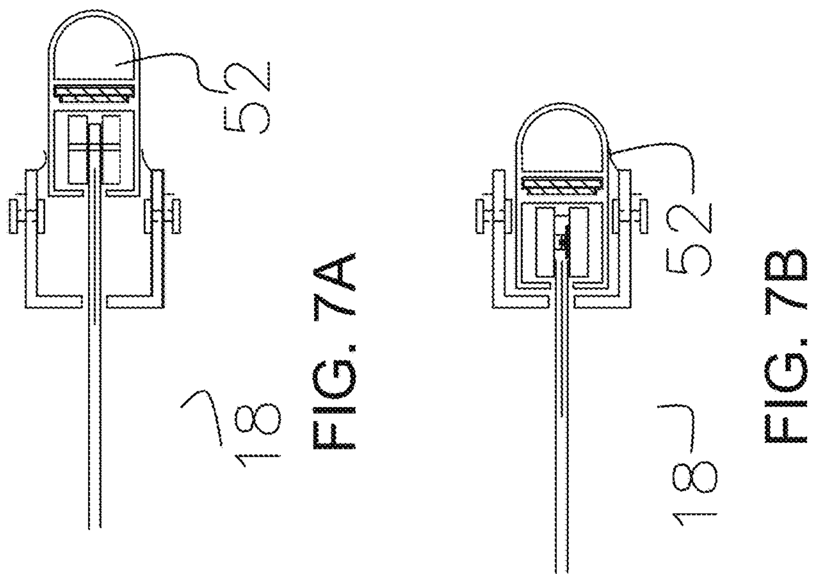
FIG. 7A
FIG. 7B
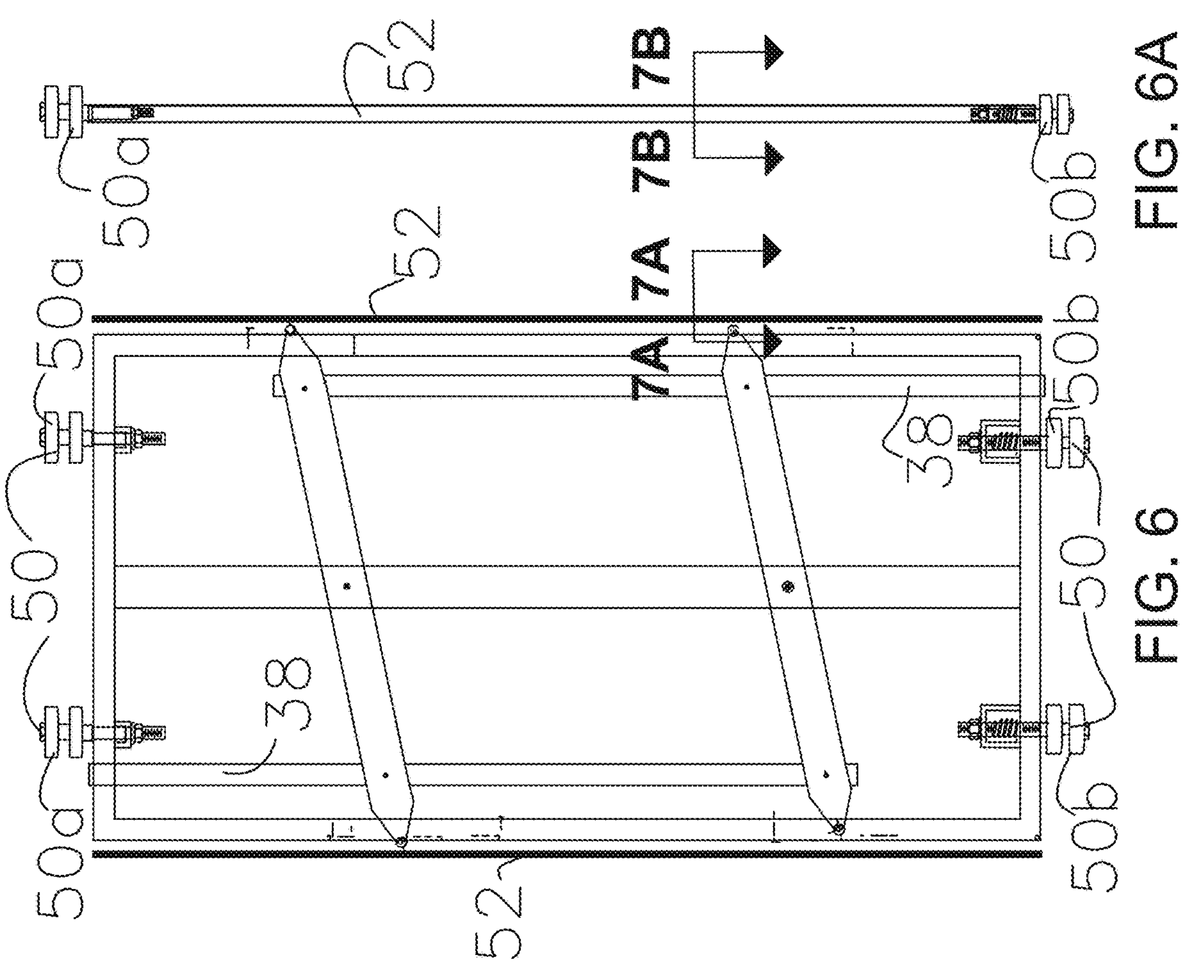
FIG. 6
FIG. 6A 20
32
20
14
20
18

ACCESS SYSTEM FOR A CONTAINER OF GOODS

The present application is related to applications filed on the same date as the present application by the same inventor. All of these applications filed on the same day are incorporated herein by reference.

FIELD OF THE INVENTION

This invention relates to an access system for a container of goods, and more particularly, to an access system for a container holding cargo for enabling access to the cargo.

BACKGROUND OF THE INVENTION

Access to containers of goods is an essential part and function of storing or transporting cargo and access to containers that carry people as cargo is an essential part and function of transporting people. Such containers have access openings that are opened and closed such as by using doors and frame supports that enable access to the goods. The general door location, size, and function are based on the use of the container. The doors can be hinged, rolled, lifted, or draped to provide the necessary enclosure and security for the goods. The configuration of the door, frame, and hardware (e.g., hinges, claps, accessories, and handles) is designed to provide access to the interior of the container. The door openings are generally framed with posts and beams. The placement of the access openings in containers is in a fixed location, and the fixed size and shape can vary but are limited.

One type of container of goods is a truck trailer. A traditional truck trailer includes a rear access door for loading and unloading cargo. At the beginning of a trailer's route, the trailer is loaded. Throughout the delivery route, the trailer is unloaded in a first on, last off fashion such that cargo is unloaded in the reverse order that it was loaded, with the last loaded goods being unloaded first. This loading/unloading technique prevents a trailer from efficiently utilizing interior space. In a worst case scenario, a trailer may need to travel along a route without any cargo at all.

SUMMARY OF THE INVENTION

In one construction, the disclosure provides an access system for a container of goods comprising an access opening in a container of goods; an upper track in the access opening; a lower track in the access opening; and a plurality of load bearing panels each independently moveable in a first direction along the upper and the lower tracks and independently moveable in a second direction different from the first direction along the upper and the lower tracks.

In another construction, the disclosure provides a container for storing goods or people comprising: a pair of end walls; a top wall; a bottom wall; an interior; at least one side wall having therein an access opening and having a plurality of load bearing panels in a first position along a first plane wherein the panels enclose the access opening; and a track, wherein each panel is independently moveable in the track from the first position to a second position in a second plane and moveable along the second plane to expose portions of the interior.

In another construction, the disclosure provides a container for holding cargo comprising: a plurality of walls oriented to have an interior adapted to hold cargo; an access opening in at least one of the plurality of walls for accessing the interior; and a plurality of load bearing panels arranged in a flush orientation in a common first plane to occlude the access opening, wherein each panel is individually moveable to a second plane then slidable along the second plane to enable access to the interior.

In another construction, the disclosure provides a container for holding cargo comprising: a plurality of walls oriented to have an interior adapted to hold cargo; an access opening in at least one of the plurality of walls for accessing the interior; and a plurality of load bearing panels having a first position in a common first plane to occlude the access opening, a second position along a second plane wherein at least one panel is in a second position allowing access to a portion of the access opening and a third position wherein all of the panels are in a third position allowing access to the entire access opening; wherein each panel is individually moveable from the first position to the second position and slidable along the second plane to enable access to the interior.

Other aspects of the disclosure will become apparent by consideration of the detailed description and accompanying drawings.

BRIEF DESCRIPTION OF THE DRAWINGS

FIG. 6 is an interior view of a panel.

FIG. 6A is a side view of the panel.

FIG. 7A is a cross-sectional view taken along line 7A-7A of FIG. 6.

FIG. 7B is a cross-sectional view taken along line 7B-7B of FIG. 6A.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

The present invention can be utilized with any type of container of goods, cargo or people such as for example, truck trailers, railroad cars, shipping containers, storage pods, buildings, boats, barges, cars, vans, planes, rockets and the like. For purposes of example, the invention will be described hereafter with reference to a trailer truck and cargo stored and transported therein, however, it should be noted that the invention is not limited to this application.

A truck trailer is used in the transportation industry, enabling the movement of various types of cargo in an economical manner. The trailer often includes a generally rectangular or box-like structure constructed from materials like steel, aluminum, or a combination thereof. In some examples, the trailer is equipped with multiple axles and wheels for load distribution and stability during transit. A hitching mechanism facilitates the connection of the trailer to a tractor truck, allowing for articulation and independent turning. In some examples, the trailer's size may range up to 53 feet in length and 102 inches in width. The rectangular or box-like structure provides the necessary strength and durability while minimizing weight and goods distribution throughout the trailer. The trailer's internal configuration may be modified to match a particular type of load carried by the trailer. For instance, the trailer may include various cargo requirements, including dry van trailers (for general freight) or refrigerated trailers (for temperature-controlled cargo), among other types of trailers. In some examples, the truck trailer features load securing mechanisms, such as straps, chains, or load bars, to immobilize the cargo during transit, preventing shifting or damage to the cargo.

The present invention enables optimized loading and unloading of various quantities of cargo and increased accessibility to that cargo regardless of where it is located in the trailer. The trailer can be loaded in any order, as opposed to a first on, last off fashion, using independently moveable panels in an access opening that provide access to all or a portion of the cargo in a nonsequential order if needed during delivery and pick routes. This optimized access to cargo provides partial or complete loads to be transferred from vehicle to vehicle, vehicle to a building or vehicle to ground. The panels enable movement of cargo without the use of a dock. This may provide time savings without the need to back a trailer into a dock and may reduce the danger from reversing the trailer.

Figure 1:
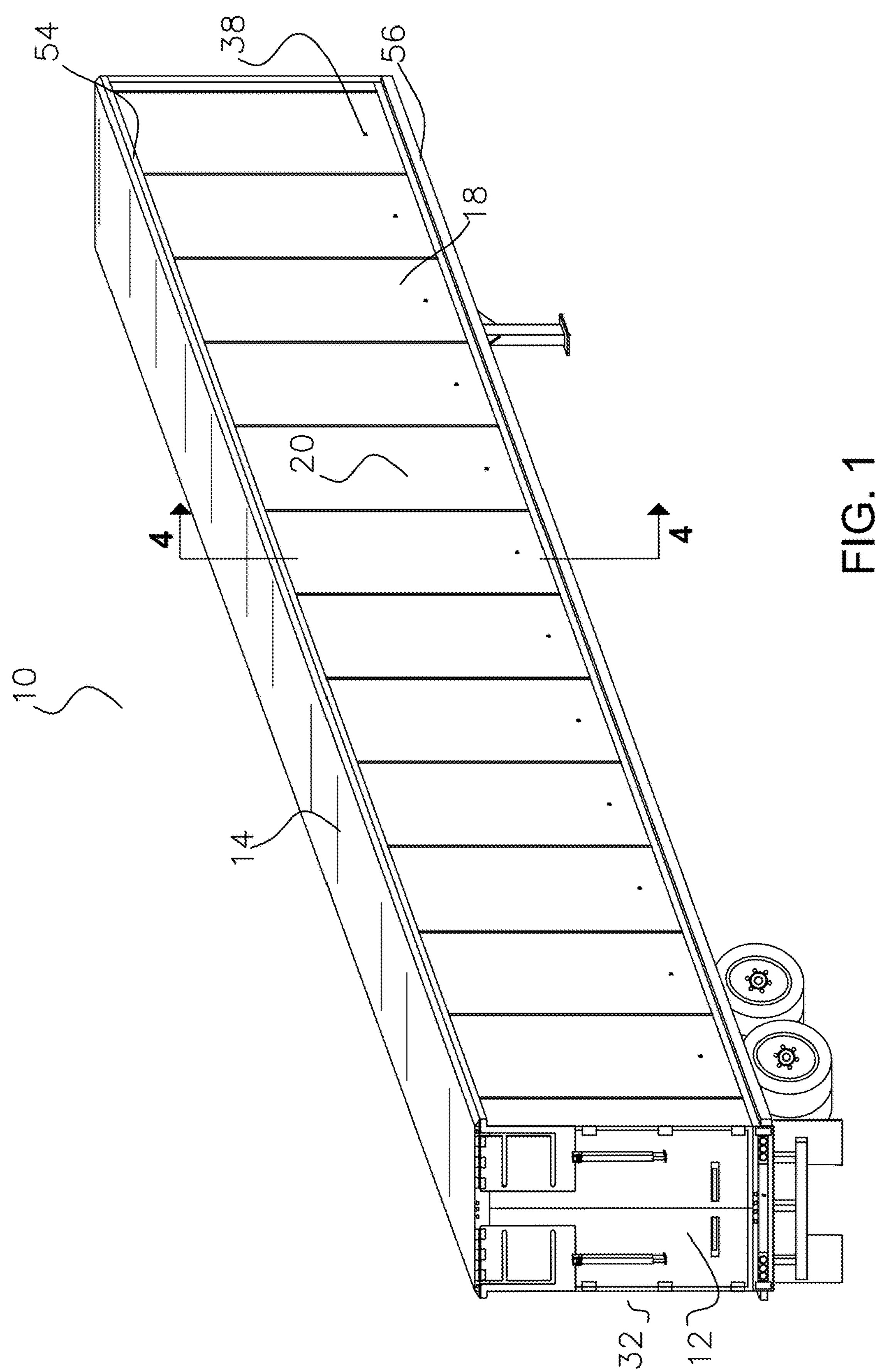
FIG. 1 is a perspective view of a truck trailer embodying the invention with panels closing an access opening.
Figure 2:
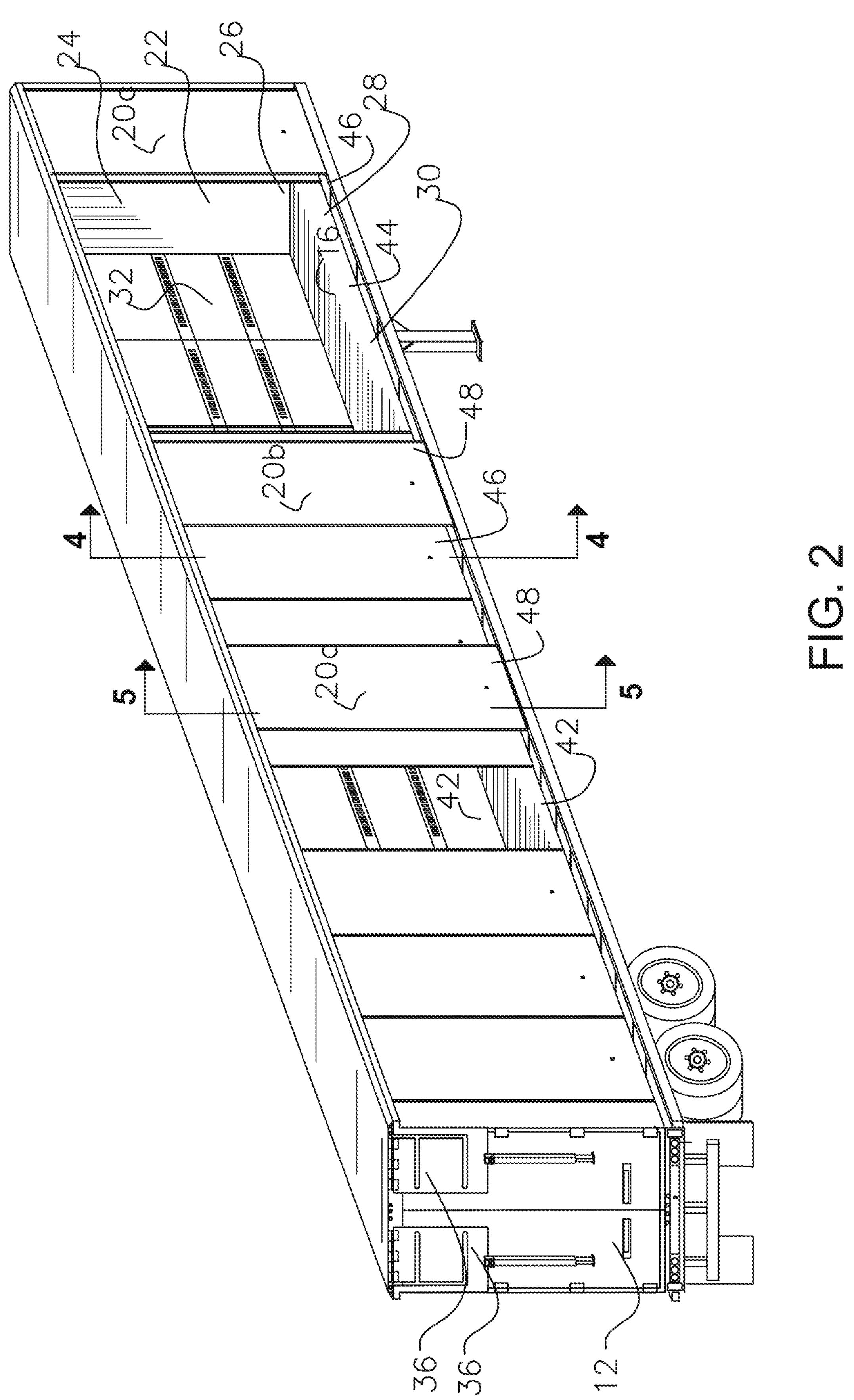
FIG. 2 is a perspective view of the truck trailer with the panels exposing two smaller portions of the access opening.
Figure 3:
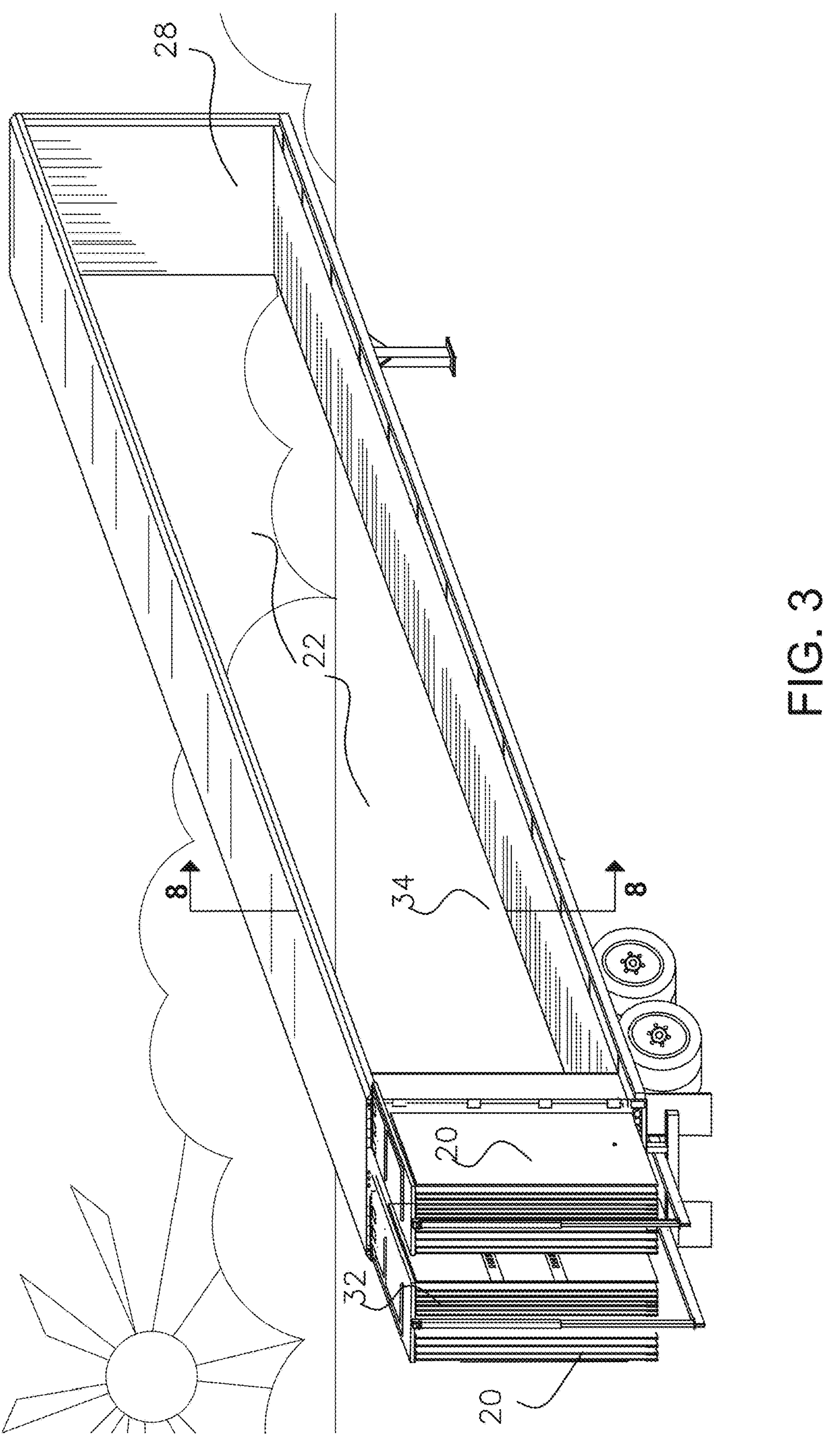
FIG. 3 is a perspective view of the truck trailer with the panels exposing the entire access opening.
Figures 4, 4A, 4B:
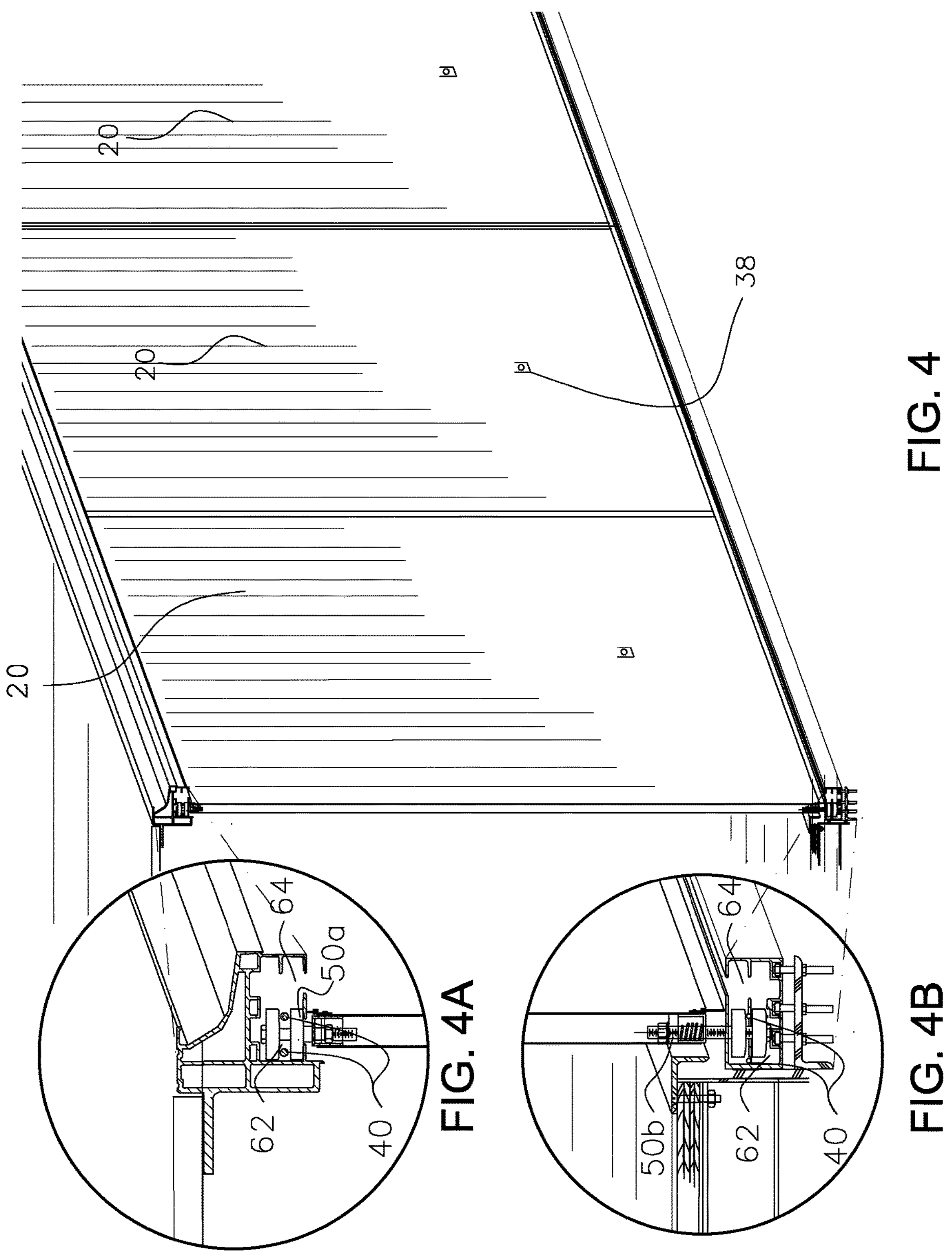
FIG. 4 is a sectional view along line 4-4 of FIG. 1.
FIG. 4A is an enlarged view of a portion of FIG. 4.
FIG. 4B is an enlarged view of a portion of FIG. 4.

With reference to FIGS. 1-3, a truck trailer 10 is illustrated embodying the invention. The trailer 10 includes a plurality of walls oriented to have an interior to hold cargo such as a pair of end walls 12, a top wall 14, a bottom wall 16, and at least one side wall 18 including a plurality of load bearing panels 20 extending across an access opening 22. It should be noted that any number of panels 20 can occlude the access opening 22 and the invention is not limited to the twelve panels 20 shown. The access opening has an upper portion 24 and a lower portion 26. As shown, the panels 20 are independently moveably to completely occlude the access opening 22 in FIG. 1, moveable to expose portions 28 and 42 of the access opening 22 in FIG. 2 and moveable to expose the entire access 22 opening in FIG. 3. Movement of each individual panel 20 can be accomplished with a manual force such as by using a handle on each panel 20 or can be accomplished using a motor operatively connected to each panel 20.

FIG. 3 shows a storage position of all of the panels 20 adjacent the end wall 12 of the trailer 10. The panels 20 are housed on a foldable rack 36 to be out of the way and not occlude the access opening 22. The trailer 10 includes a second side wall 32 also including a second access opening 34 and a plurality of independently moveable panels 20 so that cargo can be accessed from either side of the trailer 10, however, it should be noted that the second side wall 32 could also be a conventional solid wall as is known in the art.

Each of the plurality of panels 20 is independently moveable relative to the other panels 20. As shown in FIG. 1, each panel 20 has a first position so that all of the panels 20 are flush with each other and occlude the access opening 22. The first position enables weatherproofing of the panels 20 and enables them to be more aerodynamic when the trailer 10 is transported in this orientation. As shown in FIG. 2, the panel 20*a* has been moved to a second position or open to allow access to a smaller portion 42 of the access opening 22 and the panels 20*b* and 20*c* have been moved to a second position to allow access to a different sized portion 2 of the access opening 22. The first position and the second position are not axially inline and are preferably in parallel planes as shown by a first plane 46 and a second plane 48. As shown in FIG. 3, all of the panels 20 have been moved to a third storage position allowing access to the entire access opening 22.

Turning now to FIGS. 6 and 6A, each panel 20 is generally rectangular, however, other shapes can also be utilized and each panel 20 does not have to have the same configuration. Each panel 20 can be fabricated of steel, aluminum, composite, plywood, honeycombed resins, polystyrene, polyurethane sheet goods, or a combination of materials, however, other materials can also be utilized. Each panel 20 is positionable in the access opening 22 to be load bearing thus eliminating the need for any door frames or support structures and carrying the structure load through the panel 20, completing the structural load path down to the bottom wall 16. Each panel 20 preferably includes an internal lock 38 and a common lock 40. The internal lock 38 enables a specific panel 20 to be locked into a set position and the common lock 40 enables all of the panels 20 to be locked together at once into a set position at one time.

Any of the panels 20 or other portions of the truck trailer 10 may include letters, numbers, symbols, and terminology to address areas of the interior of the trailer or may include advertisements, display screens, LED panels, solar panels, or other surface mounted objects.

To enable movement of each panel 20 to the first, second and third positions, each panel 20 preferably includes trolleys 50, such as seal-bearing omni-directional trolleys, to move the panels 20 between the first, second and third positions. As shown, each panel 20 has two upper trolleys 50*a* and two lower trolleys 50*b*, however, other numbers and locations of trolleys 50 can also be utilized.

As shown in FIGS. 7A and 7B, each panel 20 is weatherproof or weather resistant and includes an expandable gasket 52 to prevent water, wind, air, and weather from penetrating into the interior of the trailer 10 when the panels 20 occlude the access opening 22. The expandable gasket 52 also allows each panel 20 to move independently between positions. The weather proofing or resistance can also be accomplished with a various other devices, materials and methods such as mechanically and pneumatically. The expandable gaskets 52 are preferably adjustable to fill any gaps between adjacent panels 20. The expandable gaskets 52 can be activated manually with a key or automatically when the panels 20 are locked individually or simultaneously. With an expandable gasket as a seal, the panels 20 allow water management when the truck trailer 10 is stationary or in transit.

Figures 8A, 8B:
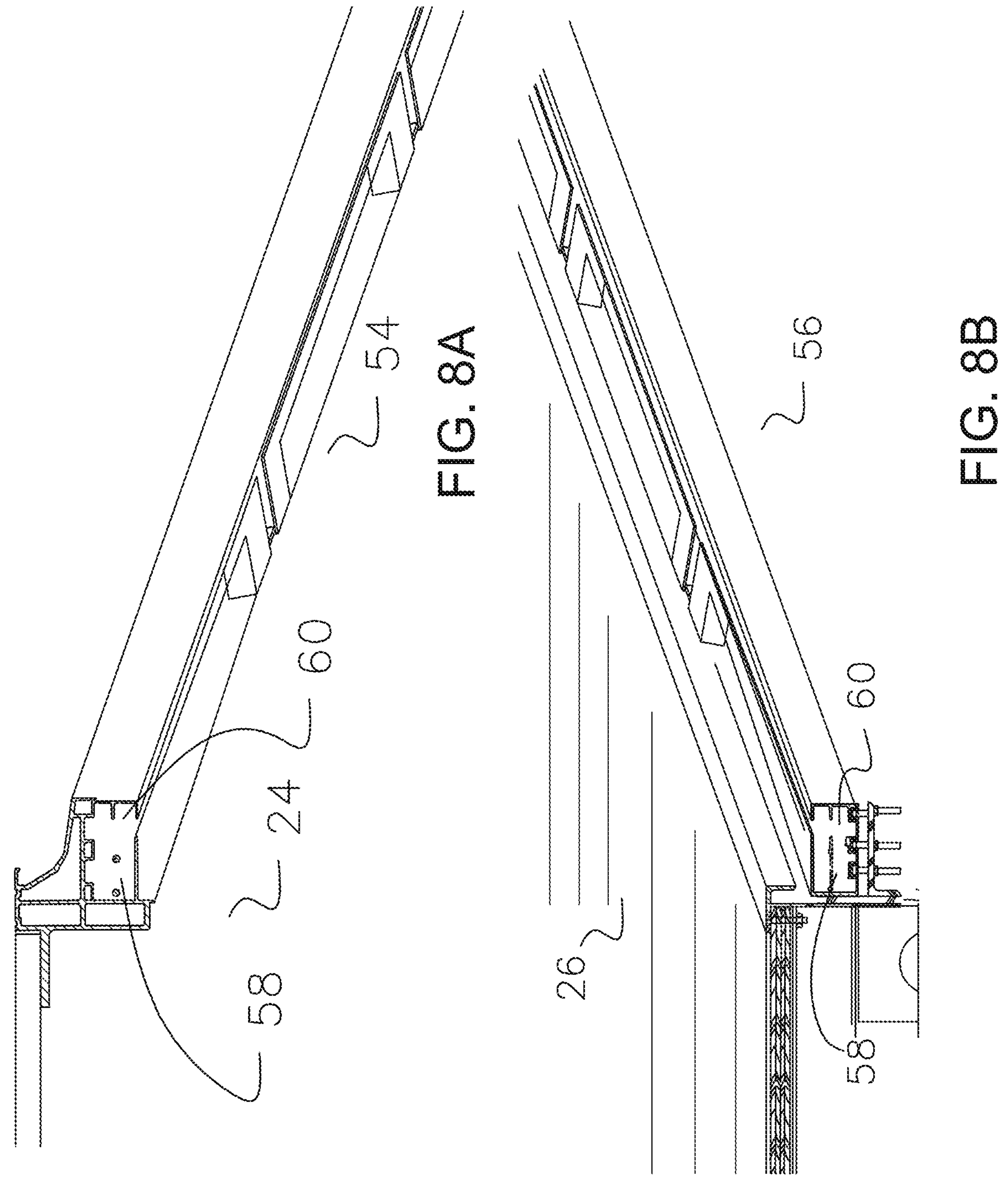
FIG. 8A is a perspective view of an upper track.
FIG. 8B is a perspective view of a lower track.

Turning to FIG. 8, an upper track 54 and a lower track 56 are shown. The upper track 54 is mounted in the upper portion 24 of the access opening 22 and the lower track 56 is mounted in the lower portion 26 of the access opening 22 as is known in the art, however, other locations can also be utilized. The tracks 54 and 56 are mounted outside of the standard 102 inches of the interior of the trailer 10 so as to not take away any storage space. The tracks 54 and 56 are preferably mounted within a three inch space so as to comply with transportation regulations. The tracks 54 and 56 can also be configured so that the second raceway 60 can be removed from the trailer 10 when not in use such as during transportation of the trailer 10. The upper track 54 and the lower track 56 can be of the same configuration but can also be of different configurations. An example of a track 54 is a 425 type track available from Kwik Wall Company. The upper trolleys 50*a* slide in the upper track 54 and the lower trolleys 50*b* slide in the lower track 56. Each track 54 and 56 has a first raceway 58 to enable movement of a panel 20 from the first position to its second position and a second raceway 60 to enable the panel 20 to move along the second plane 48 to an overlapping position with one or more adjacent panels. Each track 54 and 56 includes a first trolley compartment 62 and a second trolley compartment 64. It should be noted that the panels 20 can be moved by other means as are known in the art in addition to trolleys in tracks.

Figures 5, 5A, 5B:
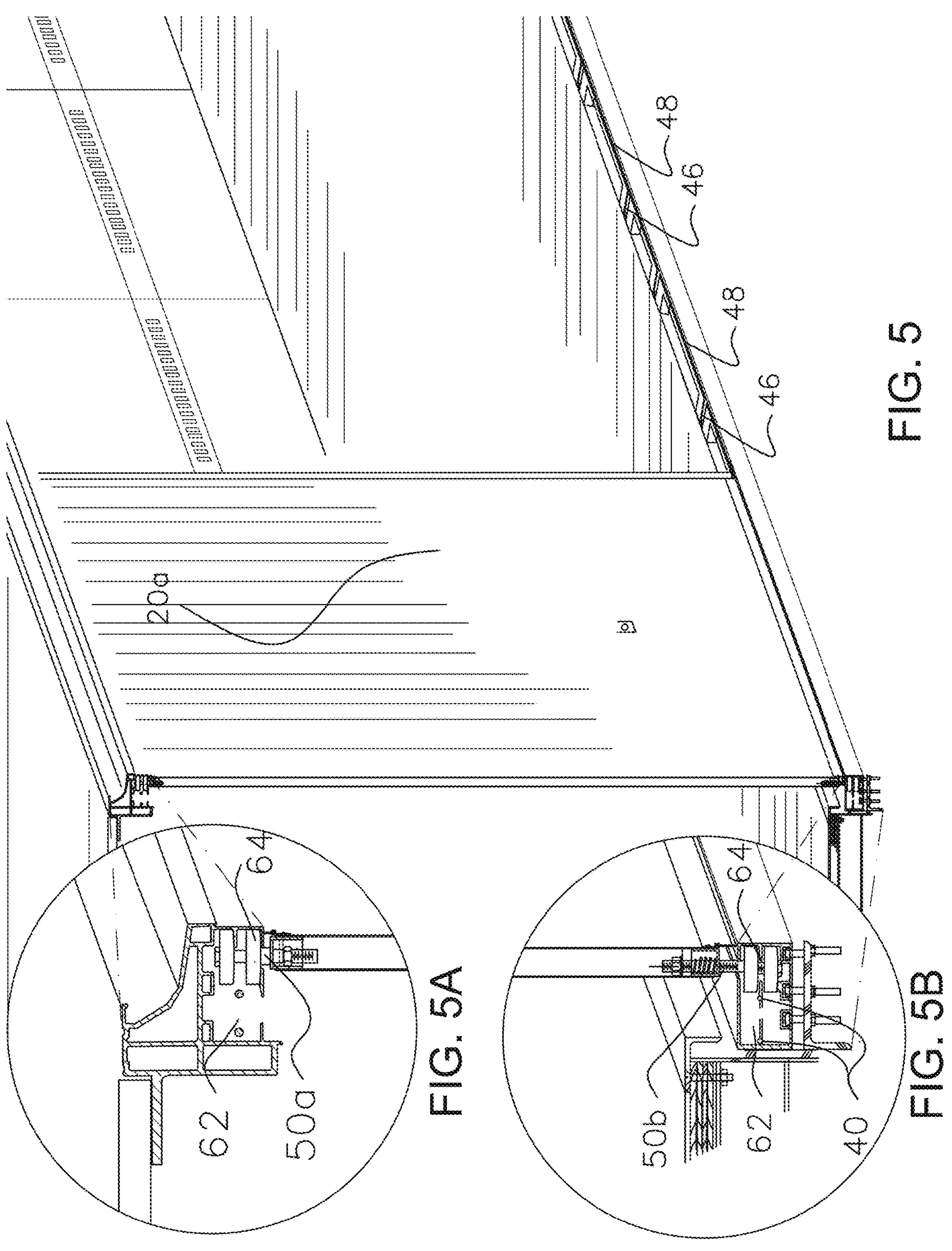
FIG. 5 is a sectional view along line 5-5 of FIG. 2.

In operation and with reference to FIGS. 1-5, if the smaller portion 42 of the access opening 22 needs to be accessed to load or unload cargo, the individual panel 20*a* is moved from its first position in the first plane 46 wherein the trolleys 50 are in the first trolley compartment 62 (FIG. 4) by sliding the panel 20*a* outwardly in a first direction away from the interior of truck trailer 10 in the first raceway 58 of the upper and lower tracks 54 and 56 wherein the trolleys 50 are in the second trolley compartment 64 (FIG. 5). Once positioned along the second plane 48, the panel 20*a* can be slid along the second plane 48 in a second direction (toward or away from the end walls 12) to allow the smaller portion 42 to be accessed. When access to the smaller portion 42 of the access opening 22 is no longer needed, the process can be reversed by moving the panel 20*a* back to its first position.

Similarly, if the portion 28 of the access opening 22 is desired to be accessed to load or unload cargo, panels 20*c* and 20*b* are moved are previously described.

The portions of the interior of the trailer 10 that can be accessed are numerous depending upon which individual panels 20 are moved to their second position or all of the panels 20 can be moved to the third storage position to access the entire access opening 22. It should also be noted that two separate portions of the interior of the trailer can be accessed at the same time through movement of the appropriate panels 20 in the two locations needing to be accessed as is shown in FIG. 2 which thereby increases the flexibility while loading and unload cargo from the trailer 10.

If the entire access opening 22 needs to be accessed, all of the panels 20 are moved from their first position to their second position, then to the third storage position on the rack 36.

Figure 9:
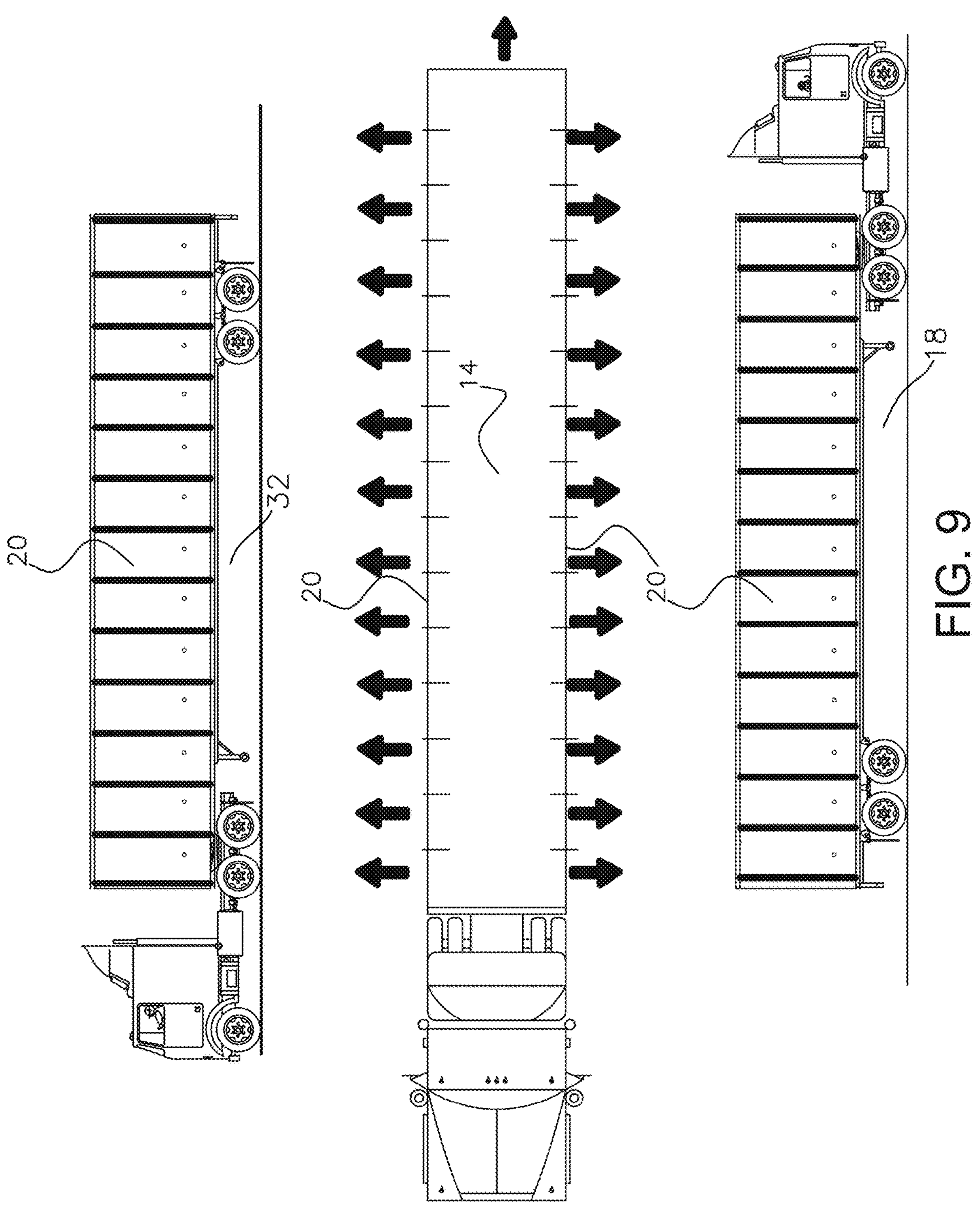
FIG. 9 a schematic view of the unloading capacity of the truck trailer.

With reference to FIG. 9, the truck trailer 10 is shown such that both side walls 18 and 32 include panels 20 such that the trailer 10 can be loaded and be unloaded in all of the directions of the arrows.

Various features and advantages of the invention are set forth in the following claims.

What is claimed is:

1. An access system for a container of goods comprising:

an access opening in a container of goods;

an upper track in the access opening;

a lower track in the access opening; and a plurality of load bearing panels each independently moveable in a first direction along the upper and the lower tracks and independently moveable in a second direction along the upper and the lower tracks, wherein the first direction and the second direction are generally perpendicular.

2. The access system of claim 1 wherein each panel includes a weatherproofing.

3. The access system of claim 1 wherein each panel includes a lock.

4. The access system of claim 1 wherein the plurality of panels has a common lock.

5. The access system of claim 1 wherein each panel is slidable along the upper track and the lower track.

6. The access system of claim 5 wherein each panel is slidable using trolleys.

7. The access system of claim 6 wherein the trolleys are omnidirectional trolleys.

8. The access system of claim 1 wherein there are two access openings in the container.

9. The access system of claim 1 wherein at least one of the panels has thereon one of a solar panel and an LED panel.

10. The access system of claim 1 wherein the panels are moveable manually.

11. The access system of claim 1 wherein the panels are moveable using a motor.

12. The access system of claim 1 wherein the panels are moveable to access all portions of the access opening.

13. A container for storing goods comprising:

a pair of end walls;

a top wall;

a bottom wall;

an interior;

at least one side wall having therein an access opening and having a plurality of load bearing panels in a first position along a first plane wherein the panels enclose the access opening; and a track, wherein each panel is independently moveable in the track from the first position to a second position in a second plane and moveable along the second plane to expose portions of the interior.

14. The container of claim 13 wherein the access opening includes the entire side wall.

15. The container of claim 13 wherein each panel is slidably movable in the track.

16. The container of claim 13 wherein each panel is slidably movable in the track using trolleys.

17. The container of claim 16 wherein the trolleys are omnidirectional trolleys.

18. The container of claim 13 wherein the at least one side wall includes the pair of side walls.

19. A container for holding cargo comprising:

a plurality of walls oriented to have an interior adapted to hold cargo;

an access opening in at least one of the plurality of walls for accessing the interior; and a plurality of load bearing panels arranged in a flush orientation in first plane to occlude the access opening, wherein each panel is individually moveable to a second plane using a track then slidable along the second plane to enable access to the interior.

20. The container of claim 19 wherein each panel is slidable along the second plane using the track.

21. The container of claim 19 wherein each panel is moveable to the second plane and slidable along the second plane using the track.

22. The container of claim 21 wherein each panel is in communication with the track using a trolley.

23. The container of claim 21 wherein the track has a first portion for moving each panel to the second plane and a second portion for sliding each panel along the second plane.

24. The container of claim 19 wherein each panel is individually lockable and the plurality of panels is lockable as a group.

25. The container of claim 19 wherein each panel is moveable manually.

26. The container of claim 19 wherein each panel is movable using a motor.

27. The container of claim 19 wherein the first plane and the second plane are generally parallel.

28. The container of claim 19 wherein when an individual panel is slid along the second plane, the individual panel will overlap with at least one other panel that is still in the first plane.

29. A container for holding cargo comprising:

a plurality of walls oriented to have an interior adapted to hold cargo;

an access opening in at least one of the plurality of walls for accessing the interior; and a plurality of load bearing panels;

the container having a first configuration wherein the plurality of load bearing panels are positioned in a common first plane to occlude the access opening, a second configuration wherein at least one panel is positioned in a second plane allowing access to a portion of the access opening and a third configuration wherein all of the panels are removed from the access opening allowing access to the entire access opening;

wherein each panel is individually moveable from the first plane to the second plane using a track and slidable along the second plane to enable access to the interior.

* * * * *